United States Patent [19]
Pfaffmann

[11] Patent Number: 5,157,232
[45] Date of Patent: Oct. 20, 1992

[54] METHOD AND APPARATUS FOR INDUCTIVELY HEATING ASYMMETRICALLY SHAPED WORKPIECES

[75] Inventor: George D. Pfaffmann, Farmington, Mich.

[73] Assignee: Tocco, Inc., Boaz, Ala.

[21] Appl. No.: 524,852

[22] Filed: May 18, 1990

[51] Int. Cl.$^5$ .............................................. H05B 6/64
[52] U.S. Cl. ...................... 219/10.57; 219/10.41; 219/10.43; 148/12.9; 148/108; 148/154; 75/200; 75/226
[58] Field of Search ............. 219/10.57, 9.5, 10.41, 219/10.43; 148/108, 12.9, 103, 154; 419/30, 31, 54; 75/200, 214, 226

[56] References Cited

U.S. PATENT DOCUMENTS

| | | | |
|---|---|---|---|
| 2,632,841 | 3/1953 | Wharff, Jr. | 219/47 |
| 2,657,301 | 10/1953 | Kincaid et al. | 219/47 |
| 2,663,789 | 12/1953 | Redmond | 219/47 |
| 3,708,645 | 1/1973 | Osborn | 219/10.41 |
| 3,779,747 | 12/1973 | Conta | 219/10.41 |
| 3,894,892 | 7/1975 | Conta | 148/108 |
| 4,720,615 | 1/1988 | Dunn | 219/10.41 |

Primary Examiner—Bruce A. Reynolds
Assistant Examiner—Tu Hoang
Attorney, Agent, or Firm—Body, Vickers & Daniels

[57] ABSTRACT

Metal workpieces having portions of different mass are sequentially stepped through a series of induction heating units having differently contoured inductors for inductively heating the workpiece portions of different mass so as to progressively elevate the portions of different mass to a uniform temperature.

27 Claims, 7 Drawing Sheets

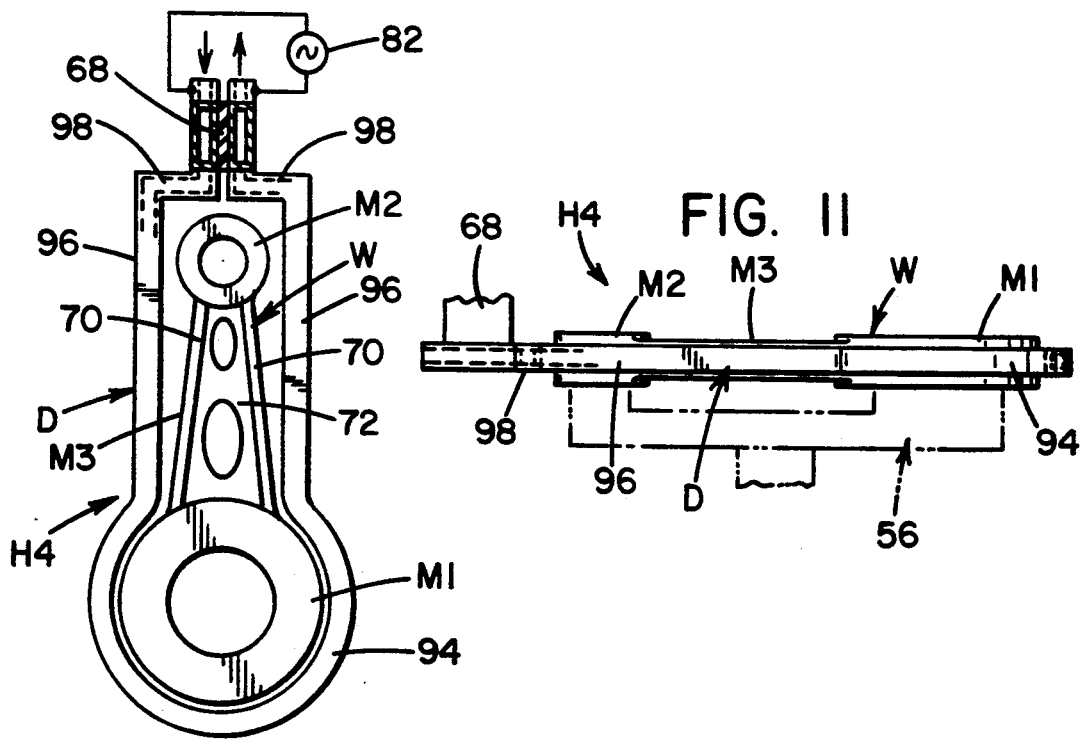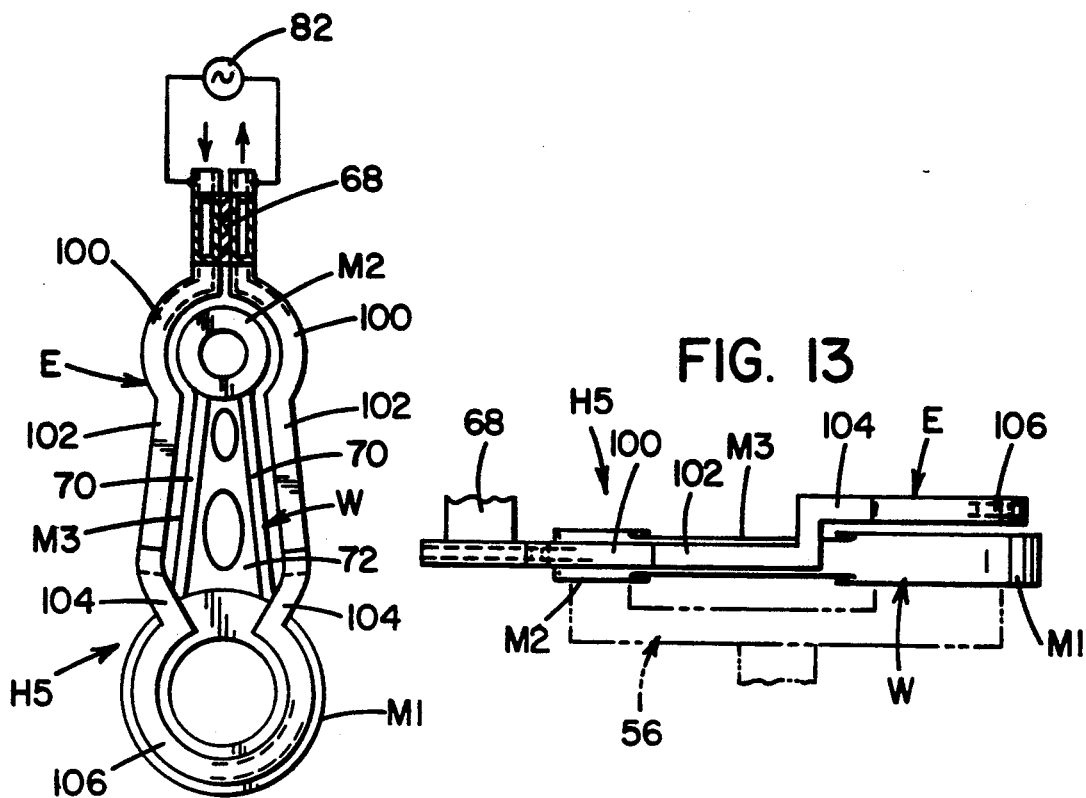

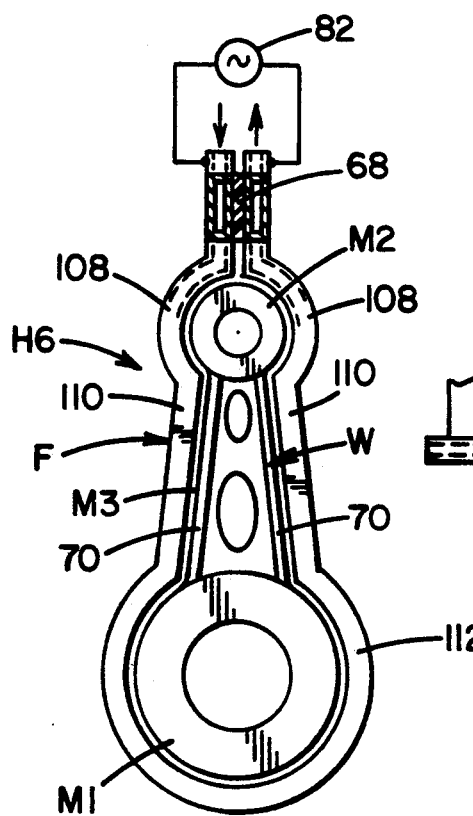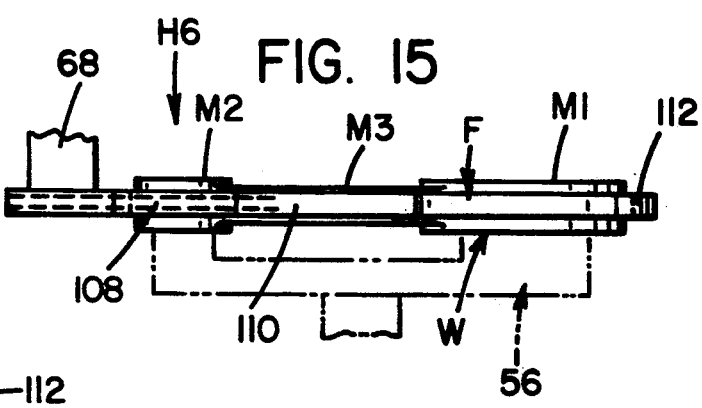
FIG. 14
FIG. 15

METHOD AND APPARATUS FOR INDUCTIVELY HEATING ASYMMETRICALLY SHAPED WORKPIECES

BACKGROUND OF THE INVENTION

The present invention relates to induction heating and, more particularly, to a method and apparatus for inductively heating workpieces having portions of different mass.

The present invention will be described herein in connection with a workpiece in the form of a connecting rod such as that used to connect the crankshaft and piston in an automotive engine and, in particular, in connection with the de-waxing and sintering of a connecting rod of powdered metal prior to final forming and sizing thereof. As will become apparent hereinafter, however, the invention is applicable to the heating of other metal workpieces having geometric configurations which provide for areas or portions of the workpiece to have different masses as well as to the de-waxing and sintering of such workpieces of compacted powdered metal other than connecting rods.

Heretofore, connecting rods of compacted powdered metal have been de-waxed and sintered prior to forging for final densification and sizing by staging a green, unsintered compact through a furnace, such as a rotary hearth furnace. The connecting rod is heated in a first zone of the furnace to a temperature of about 400° F. to 800° F., for example, to achieve migration and burn-off of the wax in the compact which is used to lubricate the particles during compacting. The connecting rod is then staged to a second heating zone in the furnace in which the temperature is elevated to a sintering temperature of about 2050° F., after which the connecting rod is cooled to a temperature suitable for forging which takes place following discharge of the workpiece from the exit end of the furnace. Disadvantages of this process include the time required to elevate the connecting rod to a uniform temperature in the range required for de-waxing, and to then elevate the connecting rod to a uniform temperature required for sintering. Another problem results from the inability to obtain good heat zone separation and temperature control in the two zones of the furnace, and this can result in an improper de-waxing operation and excessive amounts of oxygen in the powdered metal product.

In a modification of the foregoing process, to improve the de-waxing procedure, the connecting rod is staged through a furnace in which the connecting rod is de-waxed and pre-sintered to a temperature of about 1600° F., and the connecting rod is then cooled to room temperature. Thereafter, the connecting rod is reheated in a second furnace to the final sintering temperature of about 2050° F. While this approach apparently improves the end product, the time required to heat the connecting rod in each furnace to the uniform temperature required for de-waxing, pre-sintering and sintering is excessive, and the total time required to sinter the product is further increased by the cooling down stage between the pre-sintering and final sintering operation.

In connection with the preheating and sintering and the preheating, pre-sintering and reheating procedures referred to above, as well as any heating of a metal workpiece of odd geometry providing areas of different mass, it will be appreciated that the time required to heat the workpiece to any given uniform temperature is directly related to the geometry of the workpiece. In this respect, the furnace, or zone of a multiple stage furnace, is maintained at a temperature to elevate the workpiece to the given temperature, and the portion or portions of the workpiece which are of the lowest mass will reach the furnace temperature sooner than the portion or portions of higher mass. Even though there is some distribution of heat from the lower mass area to the higher mass area or areas, it will be appreciated that it takes a longer period of time to heat the larger mass portions of the workpiece to the furnace temperature, especially if there is a considerable difference in mass between the areas of high and lower mass. Therefore, whether the workpiece is a metal workpiece being heated to a temperature for further processing such as by forging or die shaping, or is a compacted powdered metal workpiece being de-waxed and sintered or being reheated in preparation for final sizing and densifying, the production rate with respect to heating a series of such workpieces for further processing is undesirably reduced by the time required to heat the areas of high and low mass to a given temperature.

SUMMARY OF THE INVENTION

The induction heating method and apparatus according to the present invention overcomes the aforementioned problems in connection with heating workpieces having an odd geometry providing areas or portions of different mass. In this respect, the portions of higher and lower mass of a workpiece are preferentially heated in sequence through the use of sequentially arranged inductors having geometries corresponding to different portions of the workpiece to be inductively heated thereby. This advantageously provides programmed heating of selected areas of the workpiece to compensate for the fact that the portions of lower mass heat faster than the portions of higher mass, whereby each of the portions of different mass is at a desired temperature when the workpiece exits the final heating stage.

The sequentially arranged inductors are located at corresponding heating stations and are designed such that the resultant inductive heating pattern in the workpiece provides for progressive heating of the portions of different mass in an optimal manner and thus heating of the workpiece to a desired temperature in a minimum period of time. The time is determined by the time required to cycle a workpiece relative to a given number of inductors, and the cycle time is determined in part by the size and geometry of the workpiece, the temperature to which it is to be elevated, the number of heating stations and thus inductors required to achieve the desired heating of the workpiece, the time required to step the workpiece between heating stations, and the dwell time for heating at each of the heating stations. Preferably, workpieces are transferred progressively from one heating station to the next by a shuttle mechanism having a plurality of workpiece supported at spaced locations thereon, whereby the forward stroke of the shuttle mechanism advances each workpiece to the next heating station and into vertical alignment with the inductor at the station. At each station the corresponding workpiece is elevated into heating relationship with the corresponding inductor and inductively heated at a controlled frequency and time. After heating, the workpieces are lowered onto the shuttle and advanced to the next station. In connection with such a shuttle arrangement, the time to advance the workpieces from one station to another and the time to elevate, inductively heat and lower a workpiece at each station are fixed times. Since the inductors in accordance with the present invention are of various configuration to achieve the desired sequential and progressive heating of the workpiece, it will be appreciated the heat induced into a portion or portions of the workpiece at the heating stations can be controlled by varying the frequency and/or time of energization of the inductor, as well as by the design of the inductor.

In any event, the preferential heating of different portions of a workpiece in sequence according to the present invention advantageously provides for a workpiece of odd geometry such as a connecting rod, produced from powdered metal, to be heated to a first uniform temperature for de-waxing in a minimum amount of time and to then be further elevated to a second uniform temperature for sintering prior to final forming and sizing operations, the latter heating also being achieved in a minimum amount of time. Likewise, the invention enables the reheating of a pre-sintered workpiece of odd geometry to a uniform sintering temperature, again in a minimum amount of time.

In accordance with yet another aspect of the invention, the portions of the workpiece having different masses can be selectively heated so as to have a desired temperature differential therebetween upon completion of the heating process. Such a temperature difference would facilitate a die forming or forging operation on the workpiece in which one portion of the workpiece would be required to undergo a higher plastic deformation which would be facilitated by a higher temperature of that portion of the workpiece.

It is accordingly an outstanding object of the present invention to provide a method and apparatus for progressively inductively heating a workpiece having portions of different mass.

Another object is the provision of a method and apparatus for selectively and sequentially inductively heating portions of a workpiece of the foregoing character so as to elevate each of the portions of different mass to a desired temperature.

Still another object is the provision of a method and apparatus for inductively heating a metal workpiece of the foregoing character so as to elevate the portions of the workpiece of different mass to a uniform temperature.

A further object is the provision of a method and apparatus for inductively heating a metal workpiece of the foregoing character by selectively and sequentially inductively heating the portions of different mass by sequentially arranged inductors having profiles corresponding to different portions of the workpiece.

Yet a further object is the provision of a method and apparatus for sintering compacted, unsintered powdered metal workpieces having portions of different mass, or reheating pre-sintered workpieces to a uniform sintering temperature in less time than heretofore required.

BRIEF DESCRIPTION OF THE DRAWINGS

The foregoing objects, and others, will in part be obvious and in part pointed out more fully hereinafter in conjunction with the written description of a preferred embodiment illustrated in the accompanying drawings in which:

FIGS. 10 and 11 are plan and side elevation views, respectively, of the fourth inductor and a workpiece in heating relationship at the fourth heating station;

FIGS. 12 and 13 are plan and side elevation views, respectively, of the fifth inductor and a workpiece in heating relationship at the fifth heating station; and, FIGS. 14 and 15 are plan and side elevation views, respectively, of the sixth inductor and a workpiece in heating relationship at the sixth heating station.

DESCRIPTION OF A PREFERRED EMBODIMENT

Figure 1:
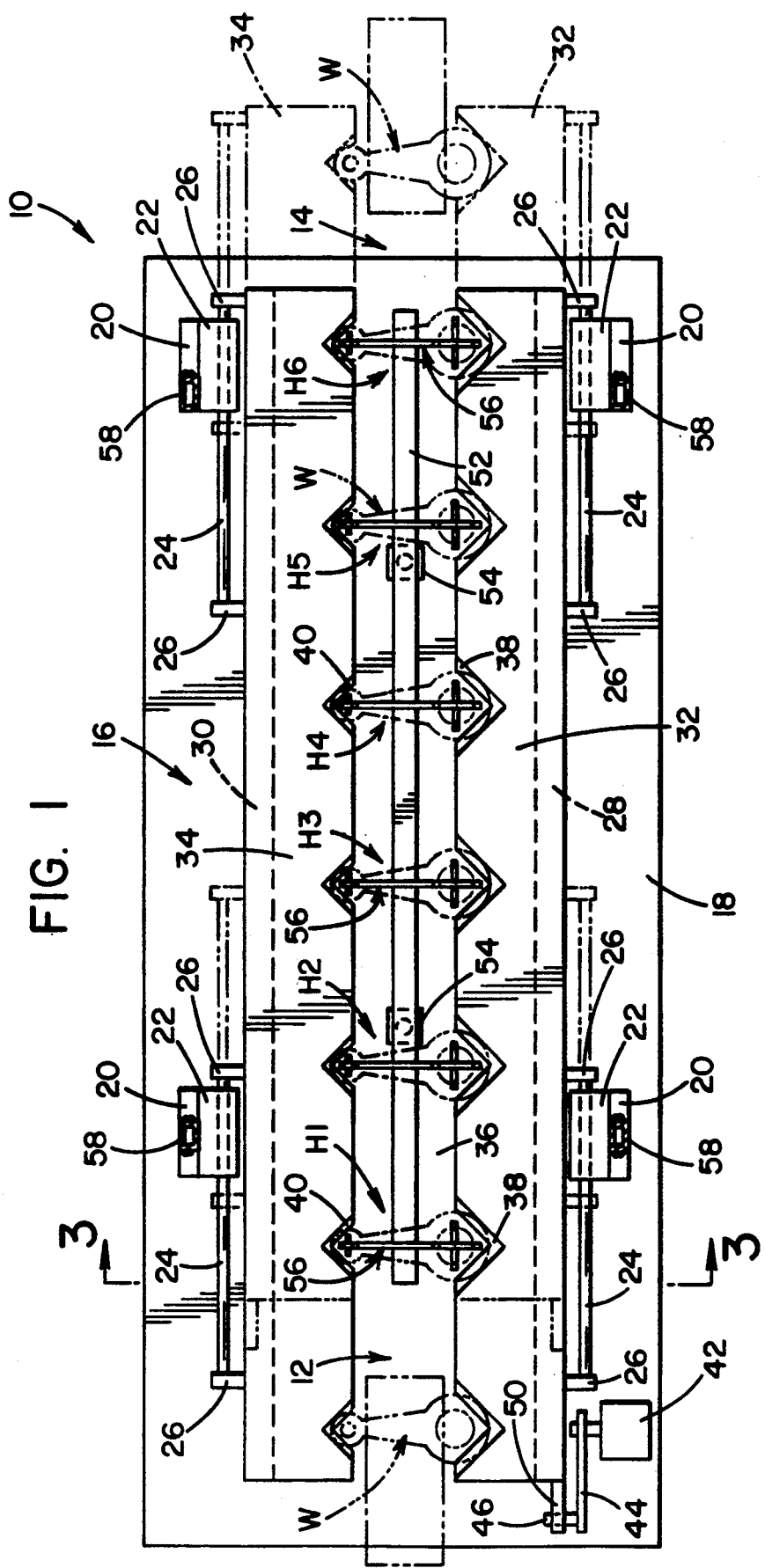
FIG. 1 is a plan view of apparatus according to the present invention.
Figure 2:
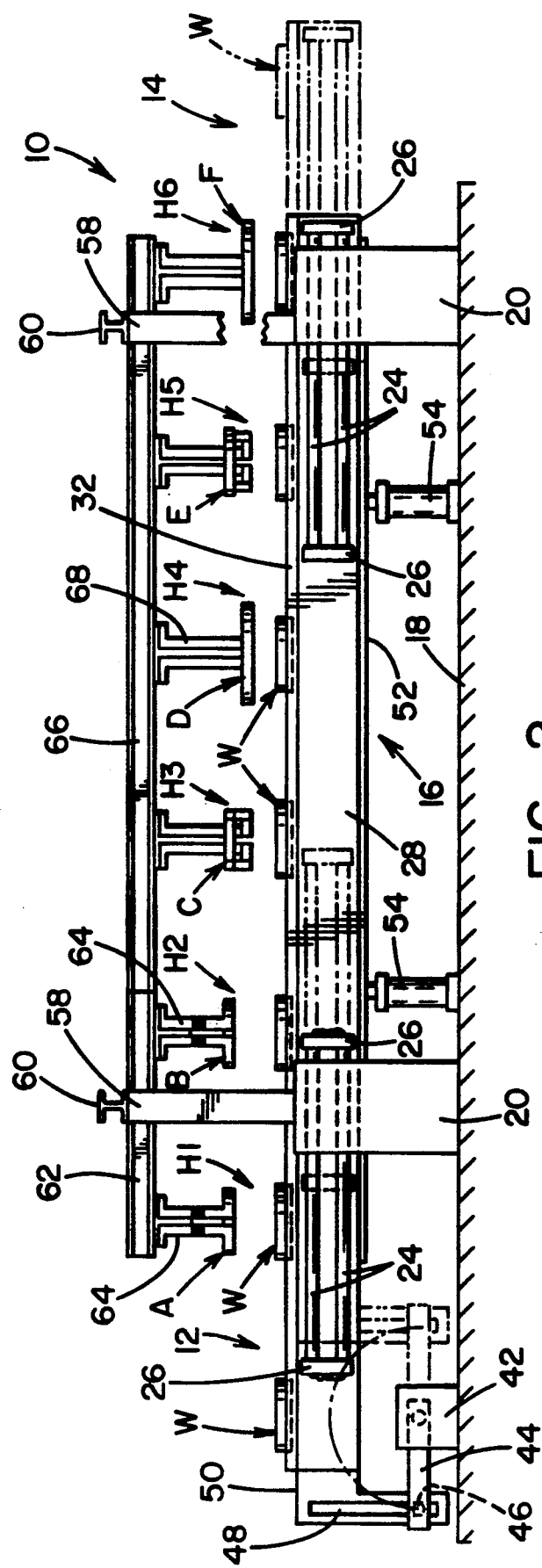
FIG. 2 is a side elevation view of the apparatus.
Figure 3:
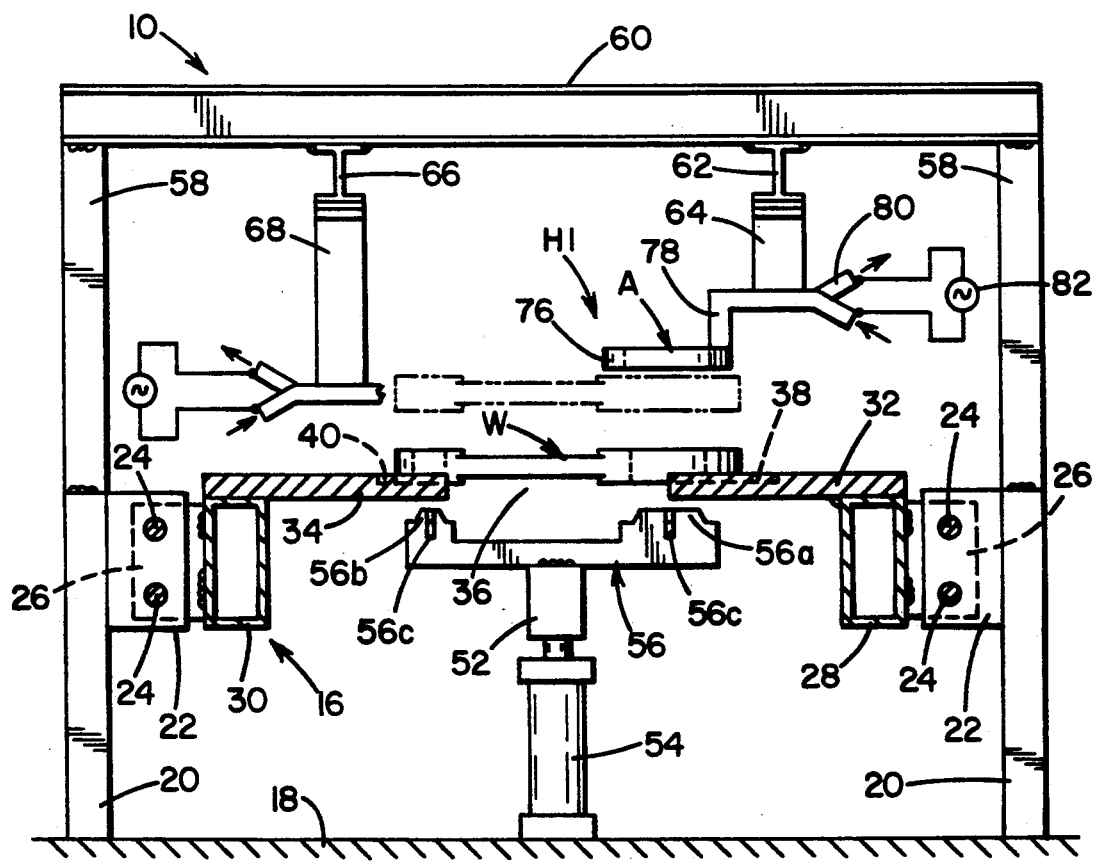
FIG. 3 is a sectional elevation view of the apparatus taken along line 3—3 in FIG. 1.

Referring now in greater detail to the drawings wherein the showings are for the purpose of illustrating a preferred embodiment of the present invention and not for the purpose of limiting the invention, apparatus 10 is illustrated in FIGS. 1-3 for shuttling workpieces W to a series of heating stations at which the workpiece is progressively inductively heated. Apparatus 10 includes an in-feed station 12 adapted to receive workpieces, automatically or manually, and a discharge station 14 from which the heated workpieces are removed, either manually or automatically, for further processing following the heating operation. In the embodiment illustrated, apparatus 10 includes six heating stations H1-H6 between the in-feed and discharge stations, each of which heating stations is provided with an inductor as described in greater detail hereinafter. Apparatus 10 further includes a shuttle assembly 16 for transferring workpieces W from in-feed station 12 to each of the heating stations and then to discharge station 14. Shuttle assembly 16, which will be described briefly hereinafter, corresponds substantially to the structure of the shuttling assemblies illustrated and described in detail in conjunction with powdered metallurgy sintering apparatus in U.S. Pat. No. 4,720,615 to Dunn which is assigned to the same assignee as the present invention, and the disclosure of which patent is incorporated herein by reference.

Briefly, as best seen in FIGS. 1-3 of the drawing, shuttle assembly 16 is supported on a suitable base 18 and comprises a frame including pairs of laterally spaced apart vertical support members 20 having inwardly facing slide blocks 22 attached to the upper ends thereof. Each slide block is longitudinally apertured for slidably receiving a pair of vertically spaced guide rods 24 which are fixed at their outer ends to brackets 26 which are attached to the corresponding one of a pair of longitudinally extending tubular side beams 28 and 30. Laterally inwardly extending support plates 32 and 34 are fixed to the top surfaces of beams 28 and 30, respectively. Support plates 32 and 34 are laterally spaced apart to define a central, longitudinally extending space 36 therebetween. The laterally inner side of plate 32 is provided with laterally inwardly open V-shaped notches defined by shoulders 38, and the laterally inner side of plate 34 is provided with a corresponding number of V-shaped notches defined by shoulders 40. The notches on the laterally opposite sides of opening 36 are in transverse alignment and are uniformly spaced apart longitudinally. Each aligned pair of shoulders 38 and 40 provides a nest for a corresponding workpiece W which provides for properly locating the workpiece relative to the shuttle when introduced into the in-feed station and maintaining the workpiece in proper alignment with the apparatus and the inductors at the heating stations during displacement of the workpiece through the apparatus.

The shuttle is displaced longitudinally relative to base 18 by means of a rotary actuating mechanism including a motor 42 mounted on base 18 and having an output crank 44 pivotally connected to a drive block 46 slidably supported in a vertical slot 48 on a plate 50 attached to side beam 28. Crank 44 is pivotal 180° from the solid line to the broken line position thereof in FIG. 2, and the coaction between block 46 and slot 48 shifts the shuttle assembly to the right in FIGS. 1 and 2 from the solid line to the broken line position. When the shuttle is in the solid line position of FIGS. 1 and 2, the leftmost pair of shoulders 38 and 40 are positioned at the in-feed station to receive a workpiece, and when the shuttle mechanism in the broken line position, the rightmost pair of shoulders positions a heated workpiece at the discharge station.

Figure 4:
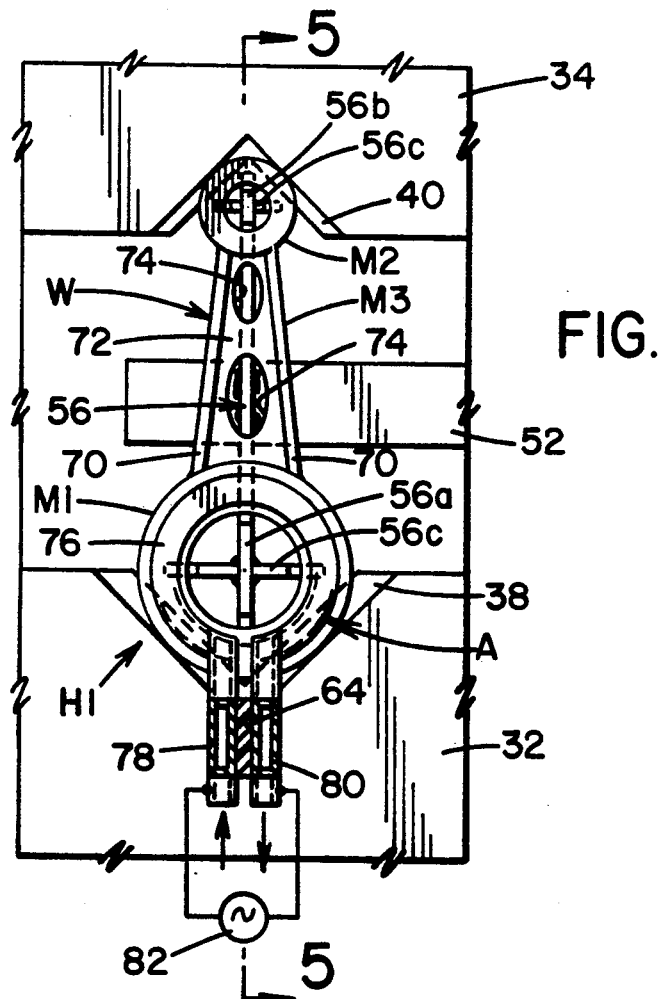
FIG. 4 is an enlarged plan view of the first heating station of the apparatus showing the first inductor and workpiece in heating relationship.
Figure 5:
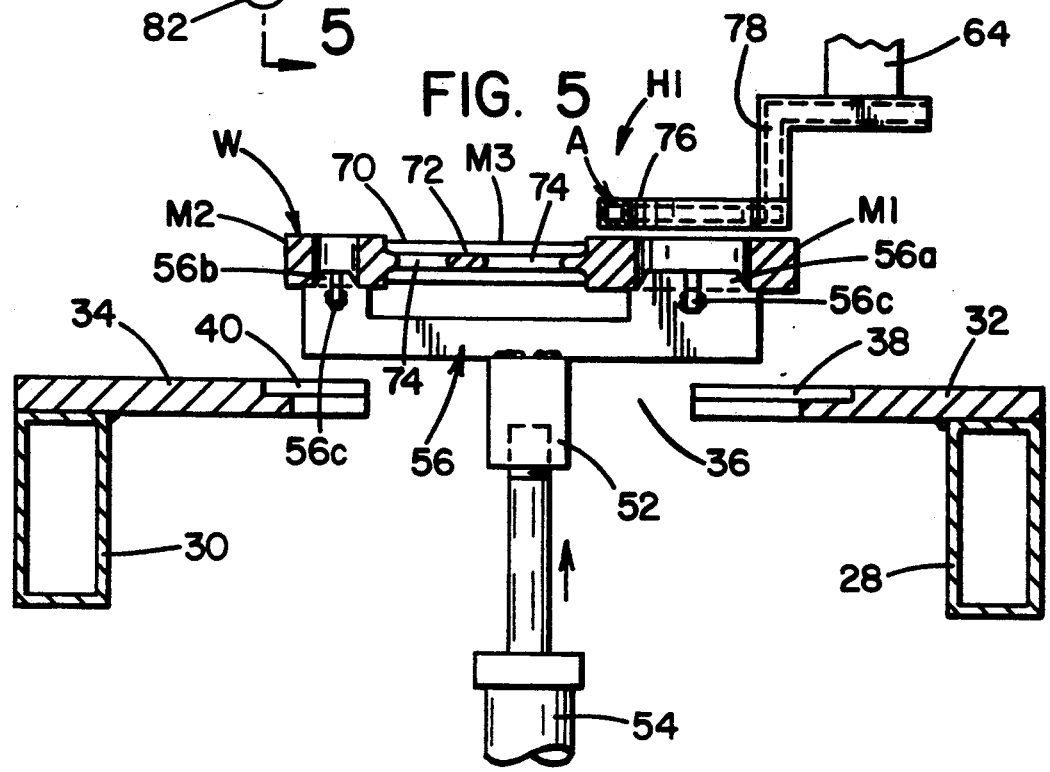
FIG. 5 is a sectional elevation view looking in the direction of line 5—5 in FIG. 4.

The shuttle apparatus further includes a lifting mechanism by which the workpieces are elevated at each of the heating stations. For purposes of simplicity in connection with the embodiment illustrated, the lifting mechanism is shown as comprising a longitudinally extending lift bar 52 adapted to be elevated and lowered by a pair of longitudinally spaced apart air cylinders 54 therebeneath. Lift bar 52 is longitudinally aligned with opening 36 between support plates 32 and 34 and is provided at spaced locations along the length thereof with laterally extending lifting pods 56. Each of the lifting pods 56 is laterally aligned with a pair of shoulders 38 and 40 of the support plates. As best seen in FIGS. 4 and 5, the workpiece W which will be described in greater detail hereinafter has opposite ends respectively received in a corresponding one of the laterally opposed shoulders 38 and 40 of support plates 32 and 34 when the workpiece is supported on the latter. The opposite ends of the workpiece are apertured and each of the lifting pods 56 is provided with end portions 56a and 56b and corresponding cross members 56c which register with the openings in the ends of the workpiece. Accordingly, each pod 56 supports and guides the corresponding workpiece as it is elevated and lowered at each of the heating stations relative to the inductor at the heating station and relative to the workpiece nest defined by the support plate shoulders 38 and 40. While the elevating and lowering of the workpieces is illustrated as being achieved through the use of an air cylinder arrangement, it will be appreciated that such elevating and lowering can be accomplished using a rack and pinion drive arrangement such as that illustrated and described in the aforementioned U.S. Pat. No. 4,720,615.

Apparatus 10 further includes an inductor at each of the heating stations H1–H6 and which inductors are illustrated in FIGS. 4–15 and are discussed in greater detail hereinafter. Each of the inductors can be suitably supported above the corresponding heating station and in this respect, for example, the apparatus can be provided with support members 58 extending upwardly from each of the vertical support members 20, and cross members 60 between the upper ends of each pair of support members 58. A longitudinally extending beam member 62 suitably attached to the left hand cross member 60 supports the inductors at heating stations H1 and H2, which inductors are suspended therefrom by suitable inductor supports 64. A beam member 66 extends longitudinally between and is suitably attached to both cross members 60 and supports the inductors at heating stations H3–H6, the latter inductors being suspended therefrom by suitable inductor supports 68.

Referring again to FIGS. 4 and 5, the workpiece shown in conjunction with the embodiment herein illustrated and described is in the form of a connecting rod of compacted powdered metal having cylindrical portions M1 and M2 at the opposite ends thereof interconnected by an arm M3. Arm M3 is defined by flanges 70 which converge in the direction from end M1 to end M2 and a web portion 72 having openings 74 therethrough. Ends M1 and M2 of the workpiece are respectively larger and smaller relative to one another and are thus of higher and lower mass relative to one another, and arm M3 is of smaller mass than either of the ends M1 and M2. Accordingly, it will be appreciated in connection with the discussion hereinafter with respect to the heating of workpiece W that portions M1, M2 and M3 thereof are respectively of high, intermediate and low mass.

In accordance with the present invention, a workpiece having portions of different mass, such as the connecting rod herein illustrated, is progressively heated as it is moved sequentially into heating relationship with a plurality of inductors, each designed to preferentially heat one or more of the areas of different mass. This provides for programming the heating of the workpiece such that each of the portions of different mass are at a desired temperature when the workpiece exits the induction heating apparatus. With the foregoing in mind, it will be appreciated from FIGS. 4 and 5 of the drawing that the inductor A at heating station H1 has a contour or profile for preferentially inductively heating the portion M1 of highest mass of workpiece W when the latter is elevated into magnetically coupled relationship with the inductor. In this respect, inductor A has a circular leg 76 parallel to and corresponding in contour to the upper surface of cylindrical end M1, and includes terminal legs 78 and 80 which, as schematically shown in FIG. 4, are connected across a high frequency power supply 82. Inductor A, as well as the other inductors to be described hereinafter, may be of a conventional hollow construction, the interior passage of which is supplied with coolant from a suitable source to maintain the operating temperature of the inductor within a controlled range, such circulation being indicated by the arrows at the ends of terminal legs 78 and 80 in FIG. 4.

Figure 6:
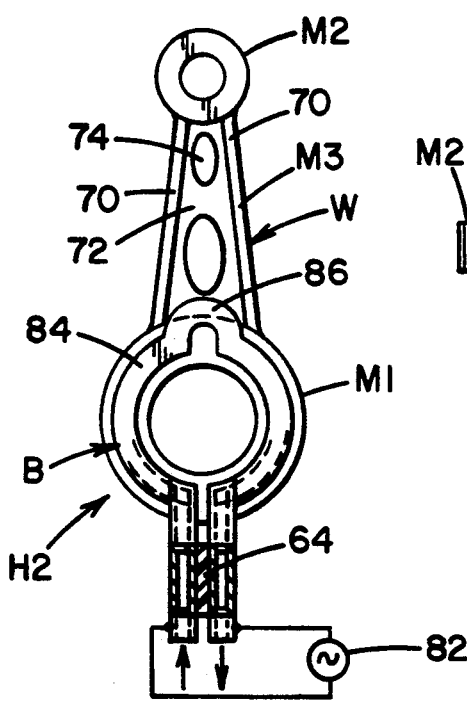
FIGS. 6 and 7 are plan and side elevation views, respectively, of the second inductor and a workpiece in heating relationship at the second heating station.
Figure 7:
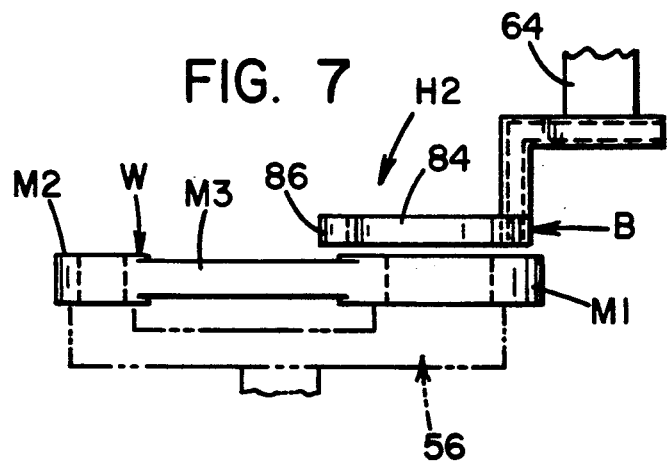

After portion M1 of the workpiece has been heated at heating station H1, the workpiece is indexed to heating station H2 and elevated into magnetically coupled relationship with an inductor B contoured as shown in FIGS. 6 and 7 of the drawing. More particularly, inductor B has generally semi-circular leg portions 84 parallel to and conforming in contour to the upper surface of cylindrical portion M1 of workpiece W, and an arcuate nose portion 86 connecting the outer ends of legs 84 and extending slightly beyond the periphery of portion M1 into the adjacent area of portion M3 of the workpiece. Thus, it will be appreciated that inductor B provides for preferentially heating high mass portion M1 and an adjacent area of low mass portion M3. It will be further appreciated that in the first heating station H1 the temperature of high mass portion M1 is initially elevated to a temperature below the final temperature for the workpiece and, at heating station H2, the temperature of high mass portion M1 is further elevated to a temperature which is still below the final temperature and the adjacent area of lowest mass portion M3 is initially inductively heated. While there is some migration of heat from portion M1 into portions M2 and M3 following heating at each of the first two stations, the latter serve to preferentially heat that portion of the workpiece which normally requires the longest time to heat to a given temperature.

Figure 8:
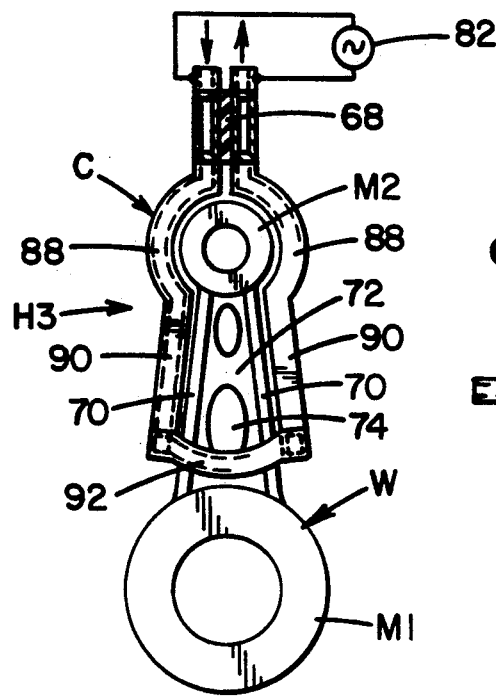
FIGS. 8 and 9 are plan and side elevation views, respectively, of the third inductor and a workpiece in heating relationship at the third heating station.
Figure 9:
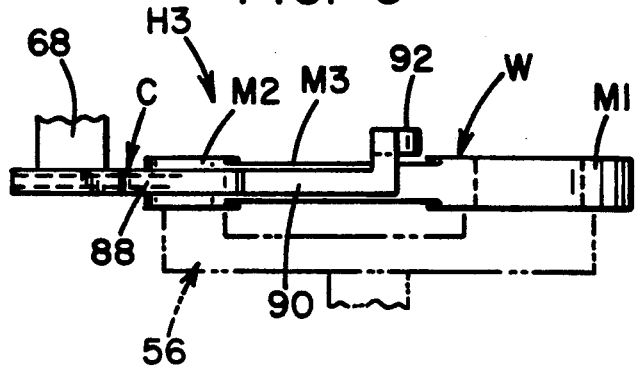

Following heating at station H2, the workpiece is indexed to heating station H3 for induction heating of the workpiece portions M2 and M3 of lower mass by an inductor C having the configuration relative to workpiece W shown in FIGS. 8 and 9 of the drawing. In this respect, inductor C has arcuate leg portions 88 extending in opposite directions from the terminal ends of the inductor about the outer periphery of circular portion M2 of the workpiece, and legs 90 extending from a corresponding one of the arcuate portions 88 parallel to the flanges 70 of portion M3 of the workpiece. Inductor C further includes a bridging portion 92 which extends upwardly and across portion M3 between legs 90 and adjacent portion M1 of the workpiece. Accordingly, it will be appreciated that at heating station H3 the portions M2 and M3 of lower mass of workpiece W are preferentially inductively heated and that the temperatures thereof are elevated to a temperature below toward the desired end temperature.

Following heating at station H3, workpiece W is indexed to heating station H4 wherein an inductor D contoured as shown in FIGS. 10 and 11 is energized to inductively heat all three portions M1, M2 and M3 of the workpiece simultaneously. More particularly, inductor D includes an arcuate leg portion 94 conforming to the outer peripheral contour of portion M1 of the workpiece, legs 96 extending generally parallel to one another from the opposite ends of leg 94 along portion M3 toward portion M2 of the workpiece, and legs 98 extending toward one another from legs 96 behind portion M2 of the workpiece. Legs 98 are connected to a corresponding one of the terminal ends of the inductor connected across the power supply. It will be noted that leg 94 is in close magnetically coupled relationship with the workpiece portion M1 of high mass, and that the parallel relationship of legs 96 to one another provides for the latter to diverge relative to portion M3 and to be considerably spaced from the outer surface of workpiece portion M2. Such a contour balances the heat induced into workpiece portions M1, M2 and M3 at heating station H4 so as to further control and program the progressive heating of the different portions towards the desired end temperature.

Following heating in station H4, the workpiece is indexed to heating station H5 wherein all three portions M1, M2 and M3 of the workpiece are simultaneously inductively heated by an inductor E contoured and associated with workpiece W as shown in FIGS. 12 and 13 of the drawing. In this respect, inductor E includes arcuate leg portions 100 conforming to and extending about the outer periphery of workpiece portion M2 from the terminal ends of the inductor connected to the power supply, and legs 102 extending from a corresponding one of the legs 100 generally parallel to and along the length of flanges 70 of workpiece portion M3. Inductor E further includes leg portions 104 extending upwardly and then inwardly from a corresponding one of the legs 102 to overlie the end face of portion M1 of the workpiece, and an arcuate leg 106 parallel to and conforming to the contour of the end face and connected to the ends of legs 104. The various legs of inductor E are generally spaced from the corresponding portion of the workpiece by a uniform air gap and further promote the programmed progressive heating of the three workpiece portions of different mass towards the desired temperature thereof.

In the embodiment illustrated, the workpiece portions M1, M2 and M3 are inductively heated to a uniform temperature which is realized in the sixth and final heating stage H6 wherein all three portions M1, M2 and M3 of the workpiece are similtaneously inductively heated by an inductor F contoured and associated with the workpiece as shown in FIGS. 14 and 15 of the drawing. Inductor F is somewhat similar to inductor E at heating station H5 and, in this respect, includes arcuate leg portions 108 extending about the outer periphery of portion M2 of the workpiece and legs 110 extending from legs 108 and parallel to flanges 70 of workpiece portion M3. Inductor F further includes an arcuate leg 112 extending about the outer periphery of workpiece portion M1 from the outer ends of the legs 110, and all of the legs are uniformly spaced from the corresponding part of the workpiece to provide a uniform air gap therebetween.

Following the final induction heating step at heating station H6, the workpiece is shuttled to the discharge station 14 of the apparatus for further processing.

While the connecting rod workpiece illustrated and described in connection with the present embodiment has areas or portions of high, low and intermediate mass, it will be appreciated that the areas of intermediate and low mass are each of a mass less than that of the part having the highest mass. Accordingly, in connection with the terminology higher and lower mass as used herein and in the appended claims, the higher mass area or portion of a workpiece is that portion having the highest mass, whereas the reference to lower mass is intended to be any one or more of the areas or portions having a mass lower than the highest mass.

It is believed that it will be readily understood from the foregoing description that a workpiece having portions of different mass is adapted to be inductively heated to elevate the temperatures of the portions of different mass to a desired temperature or temperatures by sequentially stepping the workpiece through a plurality of heating stations in which the different portions of the workpiece, individually or in combination, are selectively inductively heated so that the portions of highest mass, or more difficult areas of the workpiece to heat, are heated initially with the overall program of heating designed to bring the portions of higher and lower mass to the desired temperatures thereof at the same time and in an optimum period of time for a given workpiece configuration and/or size. It is also believed that it will be apparent from the foregoing description that the number of heating stations to which a workpiece is indexed, the configurations of the inductors at each of the heating stations, and the portion or portions of the workpiece to be inductively heated thereby will vary with the workpiece configuration and/or size. It will be appreciated too that it is possible to energize the different inductors from power sources of the same or different frequency in connection with achieving a desired programmed pattern of heating of a workpiece, and to provide for a temperature differential between the portions of the workpiece upon completing of the induction heating process to, for example, promote metal flow in a certain portion of the workpiece during a subsequent operation such as a die forming operation.

In the embodiment disclosed a connecting rod of compacted powdered metal can be preheated so as to be at a uniform temperature for de-waxing when the workpiece exits station H6. By providing a second series of heating stations corresponding to stations H1-H6 having inductors corresponding to inductors A-F, the de-waxed workpiece can be shuttled through the second series of heating stations for progressively elevating the temperature of the portions of different mass from the temperature for de-waxing to a uniform sintering temperature at the exit end of the second series of heating stations. The second series of heating stations can be in line with the first series, or parallel thereto with a cross shuttle therebetween as shown in the aforementioned U.S. Pat. No. 4,720,615. It will be further appreciated that in a similar manner a powdered metal connecting rod can be heated to a pre-sintering temperature, cooled, and later reheated to a sintering temperature, by shuttling or indexing the connecting rod through a series of heating stations provided with the inductors A-F. At the same time, however, it will be appreciated that in connection with any of the foregoing preheating, sintering or reheating operations with respect to a connecting rod of compacted metal powder the inductor configurations and/or the number of heating stations and thus inductors used can be varied from the six stations and the specific configurations of inductors A-F. It will be appreciated too that in connection with the de-waxing and sintering of powdered metal workpieces, the shuttle apparatus would preferably be provided with an exhaust vent arrangement in the preheating zone and a controlled atmosphere chamber in the sintering zone such as that illustrated and described in the aforementioned U.S. Pat. No. 4,720,615.

Many modifications of the method and apparatus disclosed herein may be employed without departing from the principles of the present invention to achieve the desired programmed heating of workpieces having a plurality of portions of different mass. Accordingly, it is to be distinctly understood that the foregoing descriptive matter is to be interpreted merely as illustrative of the present invention and not as a limitation.

Having thus described the invention, it is claimed:

1. A method of heating a metal workpiece having first and second portions respectively of higher and lower mass to a predetermined temperature comprising, inductively heating just said first portion of said workpiece to a first temperature below said predetermined temperature, inductively heating just said second portion of said workpiece to a second temperature below said predetermined temperature, and progressively inductively heating said first and second portions to elevate said first and second temperatures to said predetermined temperature.

2. The method according the claim 1, wherein said workpiece is a compacted powdered metal workpiece.

3. The method according to claim 1, wherein inductively heating only said first portion, only said second portion and both said first and second portions is for different periods of time.

4. A method of heating a metal workpiece having first and second portions respectively of higher and lower mass to a predetermined temperature comprising, inductively heating just said first portion for a first period of time to elevate a temperature of said first portion to a first temperature below said predetermined temperature, inductively heating just said second portion for a second period of time to elevate a temperature of said second portion of a second temperature below said predetermined temperature, and then simultaneously inductively heating said first and second portions for a third period of time to elevate said first and second temperatures to said predetermined temperature.

5. The method according to claim 4, wherein said heating of only said first, only said second and both said first and second portions is preformed in a plurality of sequentially arranged induction heating stations.

6. The method according to claim 5, further including inductively heating said first and second portions of said workpiece in said plurality of sequentially arranged induction heating stations using inductor means having a different profile in each of said stations.

7. The method according to claim 5, wherein said first portion of said workpiece has end and side surfaces, and said inductive heating of said first portion includes heating said first portion inwardly of said end surfaces in at least one of said stations and heating said first portion inwardly of said side surfaces in at least one other of said stations.

8. Apparatus for inductively heating a workpiece having first and second portions of different mass comprising, at least first and second inductor means respectively at first and second heating stations in sequence between entry and exit ends of said apparatus, means for moving said workpiece in a direction from said entry end toward said exit end and sequentially into magnetically couple relationship with said first and second inductor means at said first and second heating stations, means for energizing each said first and second inductor means when said workpiece is in magnetically coupled relationship therewith, said first inductor means being positioned at said first heating station for magnetic coupling with just said first portion of said workpiece, and said second inductor means being positioned at said second heating station for magnetic coupling with just said second portion of said workpiece.

9. Apparatus according to claim 8, further including third inductor means at a third heating station for simultaneously heating said first and second portions of said workpiece.

10. Apparatus according to claim 8, wherein said first portion of said workpiece has a higher mass than said second portion, and said first inductor means precedes said second inductor means with respect to a direction from said entry end toward said exit end.

11. Apparatus according to claim 10, wherein said plurality of inductor means includes third inductor means for simultaneously heating said first and second portions of said workpiece.

12. Apparatus according to claim 11, wherein said third inductor means follows said second inductor means with respect to said direction.

13. A method of inductively heating a workpiece having portions of higher and lower mass to a first predetermined temperature for said portion of higher mass and a second predetermined temperature for said portion of lower mass comprising, inductively heating just said portion of higher mass to a first temperature below said first predetermined temperature, inductively heating just said portion of lower mass to a second temperature below said second predetermined temperature, and simultaneously inductively heating said portions of higher and lower mass so as to elevate said first and second temperatures thereof to reach said first and second predetermined temperatures at the same time.

14. The method according to claim 13, wherein said predetermined first and second temperatures are equal.

15. A method of inductively heating a workpiece having first and second portions respectively of higher and lower mass comprising, sequentially advancing said workpiece through a plurality of heating stations including a last heating station, inductively heating just said first portion of said workpiece in at least two of said stations to progressively heat said first portion to a first temperature, inductively heating just said second portion of said workpiece in at least two of said stations to progressively heat said second portion to a second temperature, and controlling the heating of said first and second portions in each of said stations for said first and second portions to be at the respective first and second temperatures when said workpiece exits said last heating station.

16. The method according to claim 15, wherein controlling the heating of said first and second portions in each of said stations provides for said first and second temperatures to be equal when said workpiece exits said last heating station.

17. The method according to claim 15, wherein inductively heating said first portion of said workpiece includes inductively heating just said first portion in at least one of said stations.

18. The method according to claim 15, wherein inductively heating said second portion of said workpiece includes inductively heating just said second portion in at least one of said stations.

19. The method according to claim 18, controlling the heating of said first and second portions in each of said stations provides for said first and second temperatures to be equal when said workpiece exits said last heating station.

20. A method of sintering a compacted powdered metal workpiece having first and second portions respectively of higher and lower mass comprising, inductively heating just said first portion of said workpiece to a first temperature below a predetermined de-waxing temperature, inductively heating just said second portion of said workpiece to a second temperature below said de-waxing temperature, progressively inductively heating said first and second portions to elevate said first and second temperatures to said de-waxing temperature, inductively heating just said first portion of said workpiece to a third temperature above said de-waxing temperature and below a predetermined sintering temperature, inductively heating just said second portion of said workpiece to a fourth temperature above said de-waxing temperature and below said sintering temperature, and progressively inductively heating said first and second portions to elevate said third and fourth temperatures to said sintering temperature.

21. The method according to claim 20, wherein said heating of said first, said second and said first and second portions is performed at a plurality of sequentially arranged induction heating stations.

22. The method according to claim 21, wherein said inductive heating of said first and second portions of said workpiece to said de-waxing temperature includes inductively heating said first and second portions at a first plurality of said heating stations using inductors having a different profile in each of said first plurality of stations, and wherein said inductive heating of said first and second portions to said sintering temperature includes inductively heating said first and second portions at a second plurality of said heating stations using inductors of identical profile to the inductors at said first plurality of heating stations.

23. A method of inductively heating a compacted powdered metal workpiece having first and second portions respectively of higher and lower mass comprising, sequentially advancing said workpiece through a first plurality of heating stations including a last heating station, inductively heating just said first portion of said workpiece in at least two of said stations to progressively elevate the temperature of said first portion to a first temperature, inductively heating just said second portion of said workpiece in at least two of said stations to progressively increase the temperature of said second portion to a second temperature, and controlling the heating of said first and second portions in each of said at least two of said stations for said first and second portions to be at the respective first and second temperatures when said workpiece exits said last heating station.

24. The method according to claim 23, wherein controlling the heating of said first and second portions in each of said at least two of said stations provides for said first and second temperatures to be a uniform temperature for de-waxing said workpiece.

25. The method according to claim 24, and sequentially advancing said workpiece through a second plurality of heating stations including a last heating station, inductively heating said first portion of said workpiece in at least two of said second plurality of stations to progressively elevate a temperature of said first portion from said first temperature to a third temperature, inductively heating said second portion of said workpiece in at least two of said second plurality of stations to progressively increase a temperature of said second portion from said second temperature to a fourth temperature, and controlling the heating of said first and second portions in each of said at least two of said second plurality of stations for said first and second portions to be at the respective third and fourth temperatures when said workpiece exits the last heating station of said second plurality of heating stations.

26. The method according to claim 25, wherein controlling the heating of said first and second portions in each of said at least two of said second plurality of stations provides for said third and fourth temperatures to be a uniform temperature for sintering said workpiece.

27. A method of inductively heating a compacted powdered metal workpiece having portions of high mass, intermediate mass and low mass to a predetermined temperature for each portion comprising, inductively heating just said portion of high mass to a first temperature below the predetermined temperature therefor, inductively heating just said portion of intermediate mass to a second temperature below the predetermined temperature therefor, inductively heating just said portion of low mass to a third temperature below the predetermined temperature therefor, and then simultaneously inductively heating said portions of high mass, intermediate mass and low mass to progressively elevate said first, second and third temperatures to reach said predetermined temperature for each portion at the same time.

* * * * *